Patented Jan. 16, 1951

2,538,657

UNITED STATES PATENT OFFICE 2,538,657

TETRA ALLYL SILANE AND POLYMERS THEREOF

Eugene G. Rochow, Schenectady, N. Y., assignor to General Electric Company, a corporation of New York No Drawing. Application July 10, 1945, Serial No. 604,299

2 Claims. (Cl. 260—46.5)

The present invention relates to polymerizable and polymeric organo-silicon compounds, particularly to tetra-allyl silane, which also may be named tetra-allyl silicane, and to polymers thereof.

Although various tetra-hydrocarbon silanes have been known for many years, as far as I am aware a hydrocarbon-substituted silane in which all four of the hydrocarbon radicals attached to the silicon atom contain terminal $CH_2=CH-$ groups, has not heretofore been prepared and identified. I have found that a compound of this type, namely, tetra-allyl silane can be prepared from a silicon tetrahalide, such as silicon tetrachloride, and an allyl halide, such as allyl bromide, by the Grignard reaction. For example, allyl bromide can be reacted with magnesium in ether solution to form allyl magnesium bromide. The ether solution of this product is then reacted with silicon tetrachloride, preferably in the mol ratio of at least four mols of the allyl compound to one mol of the silicon compound. The ether solution of the products of this reaction comprising a mixture of the tetra-allyl silane and partially allylated silicon tetrachloride is poured into an excess of ice and water to hydrolyze the partially allylated compound and the magnesium salts. The tetra-allyl silane which remains dissolved in the ether layer is then recovered by fractional distillation, preferably at reduced pressures. It is a colorless liquid boiling at 215–216° C. at 760 mm. and having a faint aromatic odor. It gives the usual reactions of unsaturated compounds and burns to a white ash.

Due to the presence in this compound of four terminal $CH_2=CH-$ groups, it would be expected that it would be highly reactive and readily polymerizable. I have found, however, that the unsaturated groups of this compound are apparently retarded in their reactivity by the presence of the silicon. The compound will polymerize only under extreme conditions, for example, upon being heated to about 200° C. in air for several hours or after standing in contact with air for a period of months at room temperatures. The addition of alkaline materials, such as potassium carbonate, accelerates the heat polymerization of the compound while acids apparently inhibit the polymerization. Oxidizing agents such as potassium chlorate and benzoyl peroxide also accelerate the heat-polymerization of the material but do not appear to cause polymerization at lower temperatures.

Both the monomeric and polymeric tetra-allyl silanes can be employed for various coating and insulating applications. For example, the monomer or the liquid, partially polymerized materials may be employed as liquid impregnants for electrical capacitors, coils, and the like, particularly in those cases where an ultimate hardening of the impregnant is desired or not objectionable. As resinous materials, the polymeric materials are best suited for coating applications since the conversion thereof to a hardened state is most readily obtained in the presence or absence of a polymerization catalyst when the material is in the form of a thin film in direct contact with an oxygen-containing atmosphere.

Other materials may be incorporated into the tetra-allyl silane polymers for the purpose of modifying the properties of the latter. Such materials include fillers, pigments, and various resinous materials such as the natural resins, the cellulose esters and ethers, and the synthetic resins including both those obtained by condensation and by polymerization reactions. In those cases where the modifying agent is a polymerizable material compatible and copolymerizable with the allyl silane, it may be desirable to mix the monomeric materials and thereafter effect a co- or inter-polymerization thereof.

What I claim as new and desire to secure by Letters Patent of the United States, is:
1. Tetra-allyl silane.
2. Polymeric tetra-allyl silane.

EUGENE G. ROCHOW.

REFERENCES CITED

The following references are of record in the file of this patent:

UNITED STATES PATENTS

| Number | Name | Date |
|---|---|---|
| 2,388,161 | Kropa | Oct. 30, 1945 |